(12) United States Patent
Bandarupalli et al.

(10) Patent No.: US 11,843,536 B1
(45) Date of Patent: Dec. 12, 2023

(54) SYSTEMS, METHODS, AND APPARATUSES FOR DETERMINING DATA ROUTING IN AN ELECTRONIC ENVIRONMENT

(71) Applicant: BANK OF AMERICA CORPORATION, Charlotte, NC (US)

(72) Inventors: Jagadish Babu Bandarupalli, St. Johns, FL (US); Venkata Sairam Yelamanchili, Concord, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/098,324

(22) Filed: Jan. 18, 2023

(51) Int. Cl.
| | |
|---|---|
| H04L 29/12 | (2006.01) |
| H04L 12/66 | (2006.01) |
| H04L 45/12 | (2022.01) |
| H04W 56/00 | (2009.01) |
| H04W 72/04 | (2023.01) |

(52) U.S. Cl.
CPC ................. H04L 45/124 (2013.01)

(58) Field of Classification Search
CPC .................................................. H04L 45/124
IPC ......... H04L 12/851,29/12, 12/66; H04W 56/00
See application file for complete search history.

(56) References Cited

U.S. PATENT DOCUMENTS

| | | |
|---|---|---|
| 7,933,996 B2 | 4/2011 | Rechterman |
| 8,156,553 B1 * | 4/2012 | Church ................. G06Q 10/06 709/224 |
| 8,275,868 B2 | 9/2012 | Rechterman |
| 9,042,384 B2 | 5/2015 | Sridharan |
| 9,184,981 B2 | 11/2015 | Sarikaya |
| 9,519,500 B2 | 12/2016 | Ballani |
| 9,544,185 B1 | 1/2017 | Yadav |
| 9,756,121 B2 | 9/2017 | Hwang |
| 9,825,851 B2 | 11/2017 | Agarwal |
| 10,129,142 B2 | 11/2018 | Goliya |
| 10,320,895 B2 | 6/2019 | Puri |
| 10,348,556 B2 | 7/2019 | Cheng |
| 10,505,806 B2 | 12/2019 | Maskalik |
| 10,608,844 B2 | 3/2020 | Cidon |
| 10,862,753 B2 | 12/2020 | Hira |
| 11,012,354 B2 | 5/2021 | Taylor |
| 11,102,285 B2 | 8/2021 | Lakshminarayan |

(Continued)

*Primary Examiner* — Jude Jean Gilles
(74) *Attorney, Agent, or Firm* — Moore & Van Allen PLLC; Thomas R. Parker, II

(57) ABSTRACT

Systems, computer program products, and methods are described herein for determining data routing in an electronic environment. The method includes receiving a resource data packet to be transmitted. The resource data packet is associated with a first data center. The method also includes generating a resource data identifier associated with the resource data packet. The resource data identifier indicates the first data center. The method further includes receiving a potential transmission request associated with the resource data packet. The potential transmission request includes at least one of an originating data center or a destination data center of a potential transmission. The method still further includes determining a potential transmission status action based on the resource data identifier and the potential transmission request. The potential transmission is caused to be executed in an instance in which the first data center corresponds to the originating data center or the destination data center.

20 Claims, 4 Drawing Sheets

(56) References Cited

U.S. PATENT DOCUMENTS

| | | | |
|---|---|---|---|
| 11,303,557 B2 | 4/2022 | Chandrashekhar | |
| 2011/0283017 A1* | 11/2011 | Alkhatib | H04L 12/4633 |
| | | | 718/1 |
| 2014/0241203 A1 | 8/2014 | Elson | |
| 2014/0373140 A1* | 12/2014 | Waters, Jr. | H04L 63/1458 |
| | | | 726/22 |
| 2015/0334696 A1* | 11/2015 | Gu | G06F 9/45558 |
| | | | 718/1 |
| 2017/0024260 A1 | 1/2017 | Chandrasekaran | |
| 2018/0095981 A1* | 4/2018 | Jensen | G06F 16/1724 |
| 2018/0239725 A1 | 8/2018 | Kumar | |
| 2022/0200891 A1 | 6/2022 | Keeler | |

\* cited by examiner

SYSTEMS, METHODS, AND APPARATUSES FOR DETERMINING DATA ROUTING IN AN ELECTRONIC ENVIRONMENT

TECHNOLOGICAL FIELD

Example embodiments of the present disclosure relate generally to data routing and, more particularly, to determining data routing in an electronic environment.

BACKGROUND

Data transmissions often occur across multiple data centers at the same or similar times and tracking the data transmissions can be difficult. As a result, there are difficulties identifying and/or preventing malfeasant data transmissions in real-time or near real-time. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In an example embodiment, a system for determining data routing in an electronic environment is provided. The system includes at least one non-transitory storage device and at least one processing device coupled to the at least one non-transitory storage device. The at least one processing device is configured to receive a resource data packet to be transmitted. The resource data packet is associated with a first data center. The at least one processing device is also configured to generate a resource data identifier associated with the resource data packet. The resource data identifier indicates the first data center. The at least one processing device is further configured to receive a potential transmission request associated with the resource data packet. The potential transmission request includes at least one of an originating data center or a destination data center of a potential transmission. The at least one processing device is also configured to determine a potential transmission status action based on the resource data identifier and the potential transmission request. The potential transmission is caused to be executed in an instance in which the first data center corresponds to at least one of the originating data center or the destination data center of the potential transmission.

In various embodiments, the potential transmission status action is a rejection of the potential transmission request in an instance in the first data center is different than both of the originating data center and the destination data center of the potential transmission. In various embodiments, the resource data packet is further associated with a second data center and at least one of the first data center or the second data center is an intended originating data center and at least one of the first data center or the second data center is an intended destination data center.

In various embodiments, the first data center corresponds to a location in which the resource data packet is originally received. In various embodiments, the resource data identifier includes an alphanumerical value corresponding to the location of the data received.

In various embodiments, the at least one processing device is configured to determine at least one diversion data center and the diversion data center is used to divert transmission of the resource data packet in an instance in which the first data center is offline. In various embodiments, the at least one processing device is configured to determine a transmission lag value of transmitting the resource data packet with the diversion data center replacing the first data center and cause execution of a diversion action based on the transmission lag value. In such an embodiment, the first data center is brought online in an instance in which the transmission lag value is above a lag threshold.

In another example embodiment, a computer program product for determining data routing in an electronic environment is provided. The computer program product includes at least one non-transitory computer-readable medium having computer-readable program code portions embodied therein. The computer-readable program code portions include an executable portion configured to receive a resource data packet to be transmitted. The resource data packet is associated with a first data center. The computer-readable program code portions also include an executable portion configured to generate a resource data identifier associated with the resource data packet. The resource data identifier indicates the first data center. The computer-readable program code portions further include an executable portion configured to receive a potential transmission request associated with the resource data packet. The potential transmission request includes at least one of an originating data center or a destination data center of a potential transmission. The computer-readable program code portions still further include an executable portion configured to determine a potential transmission status action based on the resource data identifier and the potential transmission request. The potential transmission is caused to be executed in an instance in which the first data center corresponds to at least one of the originating data center or the destination data center of the potential transmission.

In various embodiments, the potential transmission status action is a rejection of the potential transmission request in an instance in the first data center is different than both of the originating data center and the destination data center of the potential transmission. In various embodiments, the resource data packet is further associated with a second data center and at least one of the first data center or the second data center is an intended originating data center and at least one of the first data center or the second data center is an intended destination data center.

In various embodiments, the first data center corresponds to a location in which the resource data packet is originally received. In various embodiments, the resource data identifier comprises an alphanumerical value corresponding to the location of the data received.

In various embodiments, the computer program product further includes an executable portion configured to determine at least one diversion data center and the diversion data center is used to divert transmission of the resource data packet in an instance in which the first data center is offline. In various embodiments, the computer program product further includes an executable portion configured to determine a transmission lag value of transmitting the resource data packet with the diversion data center replacing the first data center and an executable portion configured to cause execution of a diversion action based on the transmission lag value. In such an embodiment, the first data center is brought online in an instance in which the transmission lag value is above a lag threshold.

In still another example embodiment, a computer-implemented method for determining data routing in an electronic environment is provided. The method includes receiving a resource data packet to be transmitted. The resource data packet is associated with a first data center. The method also includes generating a resource data identifier associated with the resource data packet. The resource data identifier indicates the first data center. The method further includes receiving a potential transmission request associated with the resource data packet. The potential transmission request includes at least one of an originating data center or a destination data center of a potential transmission. The method still further includes determining a potential transmission status action based on the resource data identifier and the potential transmission request. The potential transmission is caused to be executed in an instance in which the first data center corresponds to at least one of the originating data center or the destination data center of the potential transmission.

In various embodiments, the potential transmission status action is a rejection of the potential transmission request in an instance in the first data center is different than both of the originating data center and the destination data center of the potential transmission. In various embodiments, the resource data packet is further associated with a second data center and at least one of the first data center or the second data center is an intended originating data center and at least one of the first data center or the second data center is an intended destination data center.

In various embodiments, the first data center corresponds to a location in which the resource data packet is originally received, and the resource data identifier includes an alphanumerical value corresponding to the location of the data received.

In various embodiments, the method also includes determining at least one diversion data center and the diversion data center is used to divert transmission of the resource data packet in an instance in which the first data center is offline.

In various embodiments, the method also includes determining a transmission lag value of transmitting the resource data packet with the diversion data center replacing the first data center and causing execution of a diversion action based on the transmission lag value. In such an embodiment, the first data center is brought online in an instance in which the transmission lag value is above a lag threshold.

The features, functions, and advantages that have been discussed may be achieved independently in various embodiments of the present disclosure or may be combined with yet other embodiments, further details of which can be seen with reference to the following description and drawings.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1A:
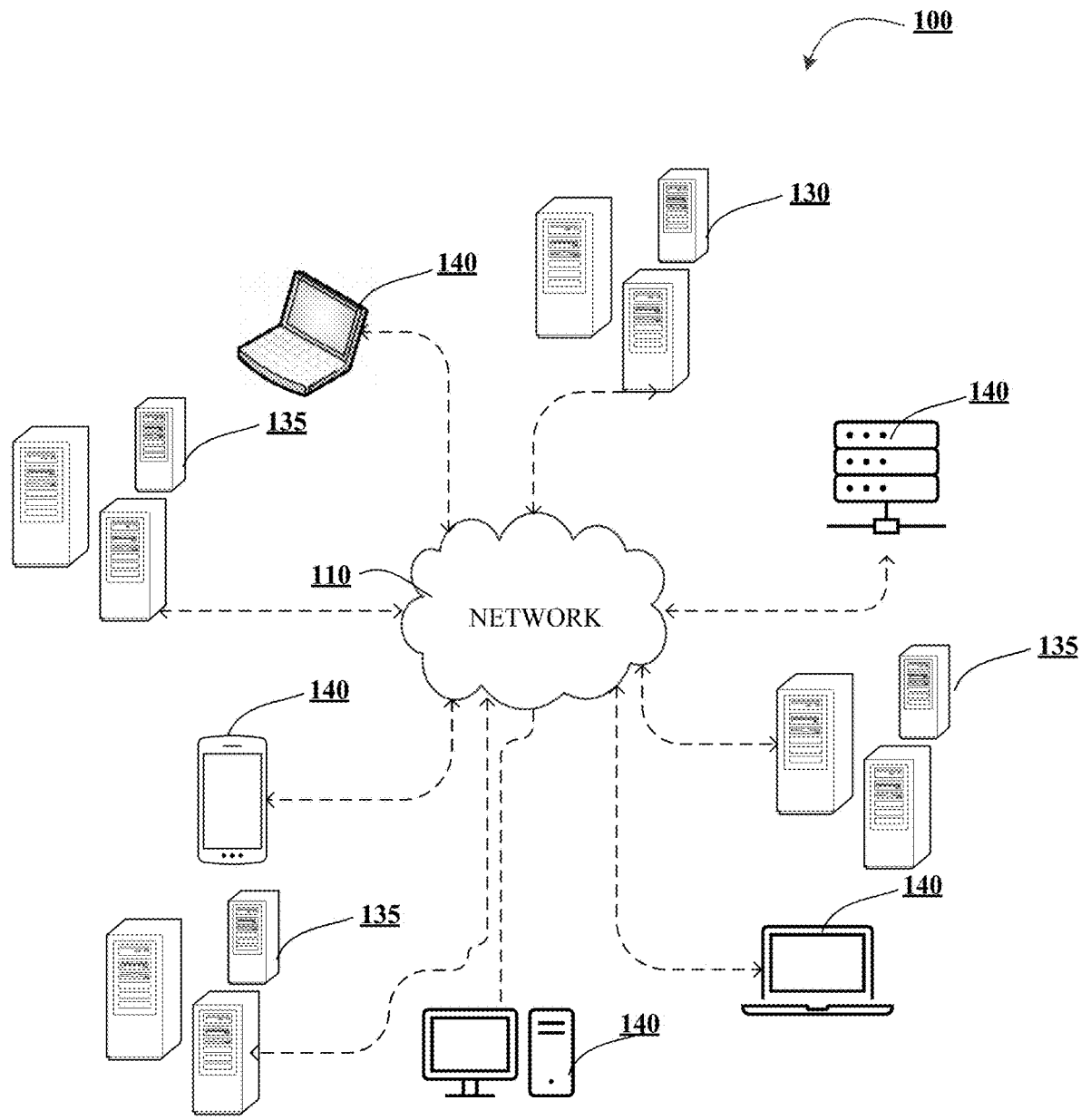
FIGS. 1A-1C illustrates technical components of an exemplary distributed computing environment for determining data routing in an electronic environment, in accordance with various embodiments of the present disclosure.

Embodiments of the present disclosure will now be described more fully hereinafter with reference to the accompanying drawings, in which some, but not all, embodiments of the disclosure are shown. Indeed, the various inventions may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure, and positioning (distal phalanges, intermediate phalanges, proximal phalanges, and the like)), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Managers in an electronic network, especially managers which manage multiple data centers acting at the same time or at similar times sometimes have difficulty ensuring all of the data being transmitted to the intended data center. Various data centers may include information relating to a resource data packet and therefore data needs to be transmitted from and/or to the given data center to allow for the transmission to be successful. However, data is often transmitted between various data centers without regard to the intended data center. The amount of data processing and transmission occurring across data centers can make this even more difficult to monitor.

Various embodiments of the present disclosure provide a system for routing data in an electronic network. The data is routed correctly by generating a unique resource data identifier for data transmissions. The resource data identifier indicates one or more data centers that are associated with the resource data packet. The resource data identifier may indicate one or more data centers in which the original data was transmitted and therefore may have information relating to the resource data packet stored therein. A given data center may store information relating to a data transmission that is not captured in the resource data packet (e.g., the resource data packet may not include the data being transmitted, but instead may include information relating to the data being transferred). For example, a peer-to-peer resource sharing network may receive and/or transmit a request for a resource transaction (e.g., a potential transmission request) from an end-point device(s) 140 and/or the like, and the request may be transmitted to a data center based on proximity to the end-point device submitting the request. In such an instance, the resource data packet may indicate one or more data centers in which the transmission should be processed (e.g., a given data center may include data relating to one of the users of the peer-to-peer resource sharing network). The resource data identifier can be used to monitor for malfeasant activity. For example, the system may identify an instance in which the resource data packet is being processed by an unusual data center (e.g., a data center not associated with the resource data identifier). The present disclosure provides a solution to issues with large scale resource management and data transmission. Namely, various embodiments of the present disclosure provide automated data transmission tracking across a network in real-time or near real-time.

Figure 1B:
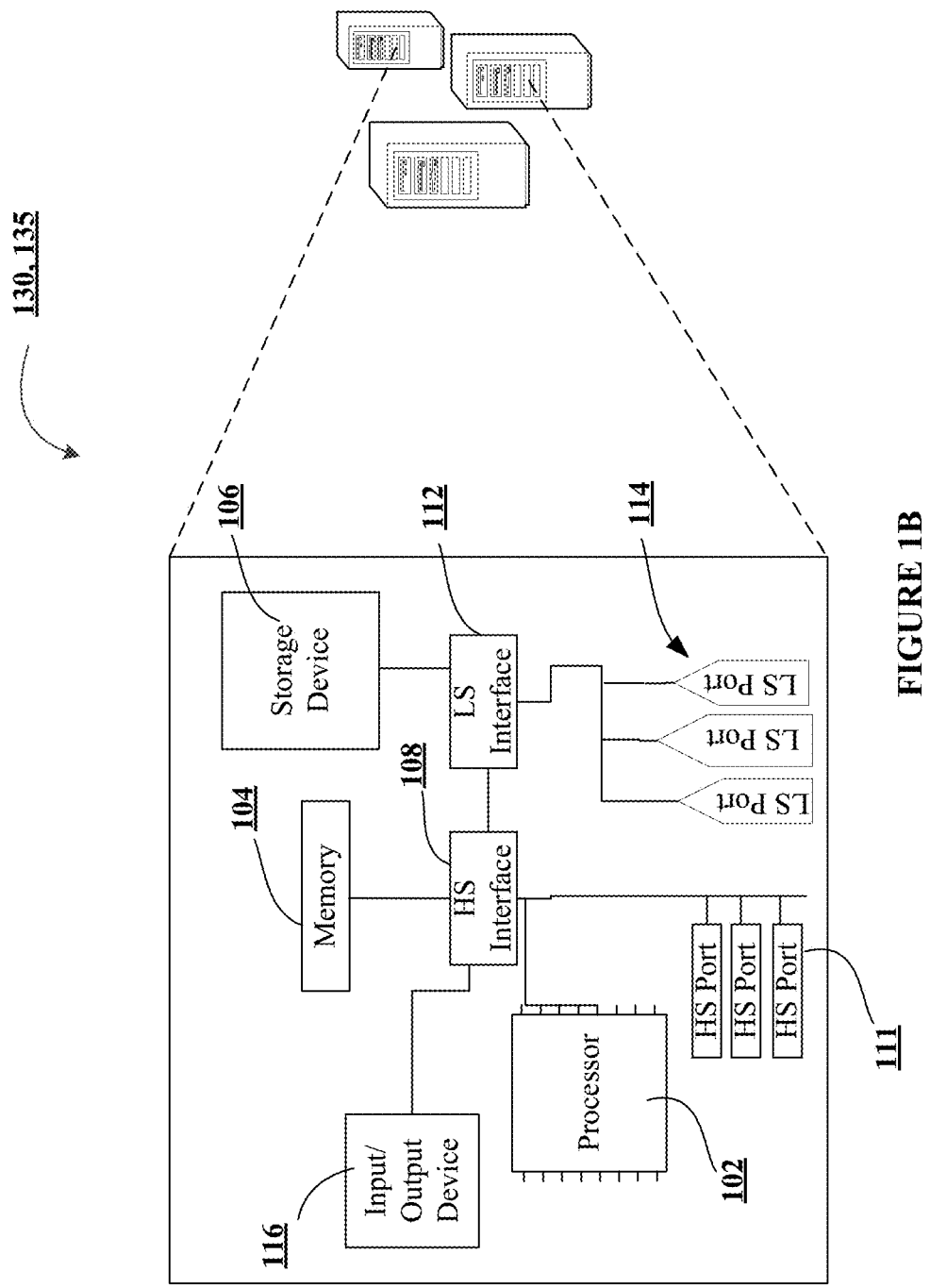
Figure 1C:
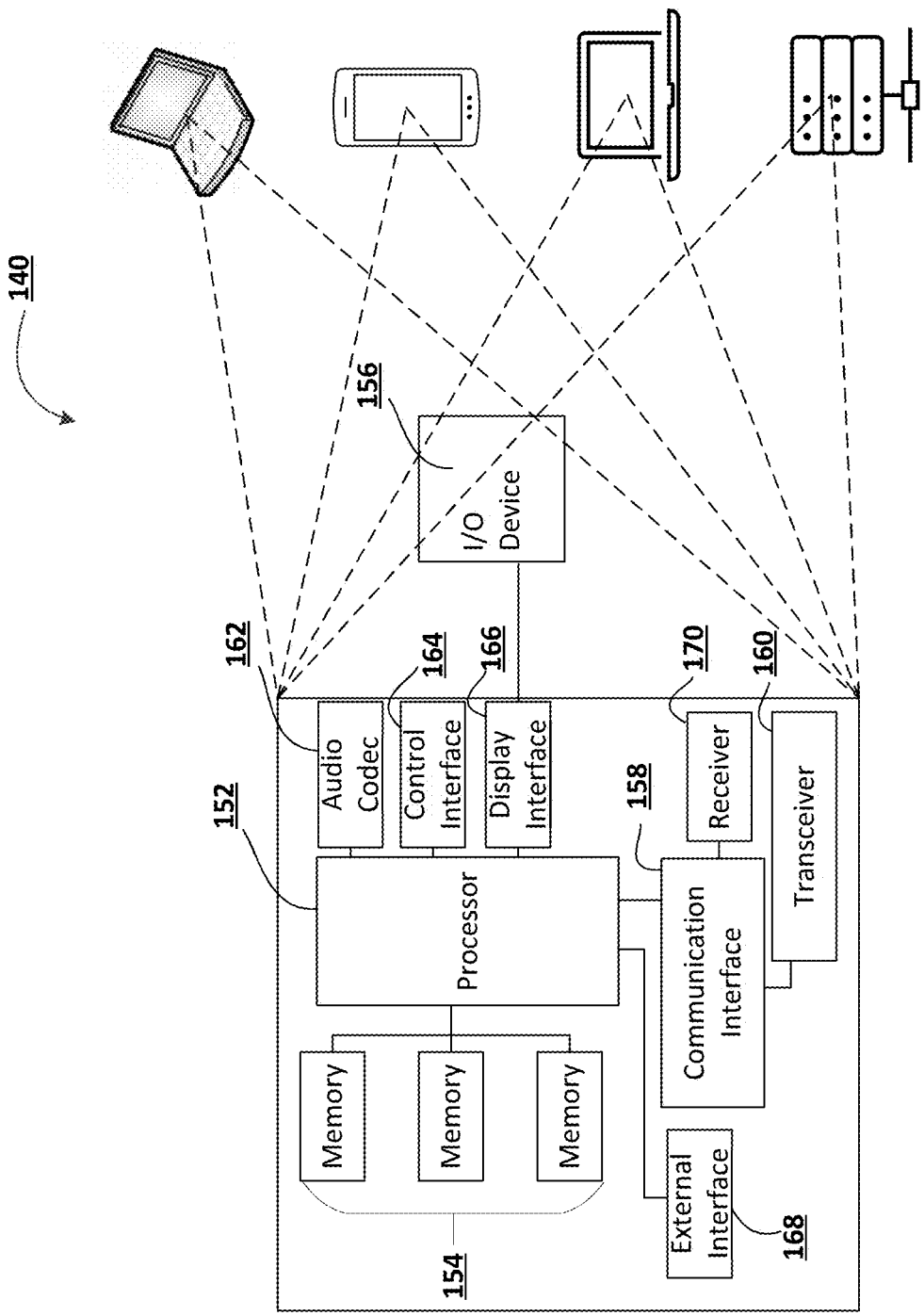

FIGS. 1A-1C illustrate technical components of an exemplary distributed computing environment for determining data routing in an electronic environment, in accordance with an embodiment of the disclosure. As shown in FIG. 1A, the distributed computing environment 100 contemplated herein may include a system 130 (e.g., a data routing system), one or more data centers 135, an end-point device(s) 140, and a network 110 over which the system 130, data centers 135, and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, data center, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The data center(s) 135 (or "datacenter") may be part of, or in communication with, the system 130. The data centers 135 may be configured to transmit, process, and/or store data across the network 110. A data center 135 may include one or more servers, just as the system 130. In some embodiments, one or more data centers 135 may share component(s) with the system 130 (e.g., the system 130 may share a processor with one or more data centers). Additionally or alternatively, the data center(s) 135 may be distinct from, but in communication with, the system 130 via the network 110. The data center(s) 135 may be stored in different locations (e.g., a data center in a given location may have one or more servers discussed herein). Additionally, the data center(s) 135 may be individual servers of a singular data center (e.g., one or more racks of a data center may be an individual data center). Alternatively, the data center(s) 135 may have distinct physical locations from one another. The location of the data center(s) 135 discussed herein may refer to either the physical location of the data centers and/or the network location of the data center (e.g., based on the order of transmission between parts of the environment 100).

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosure described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of an example system 130 and/or an example data center 135, in accordance with an embodiment of the disclosure. While discussed herein as components of the system 130, various data centers 135 may include the components discussed herein. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low-speed expansion port 114 (shown as "LS Port") and storage device 110. Each of the components 102, 104, 106 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130 or data center(s) 135. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other. Additionally, one or more components of the system 130 and the one or more data centers 135 may also be combined to achieve the processes discussed herein.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a micro-drive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single in Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130, data center(s) 135, and end-point device(s) 140, and techniques described here can be realized in digital electronic circuitry, integrated circuitry, specially designed ASICs (application specific integrated circuits), computer hardware, firmware, software, and/or combinations thereof.

Figure 2:
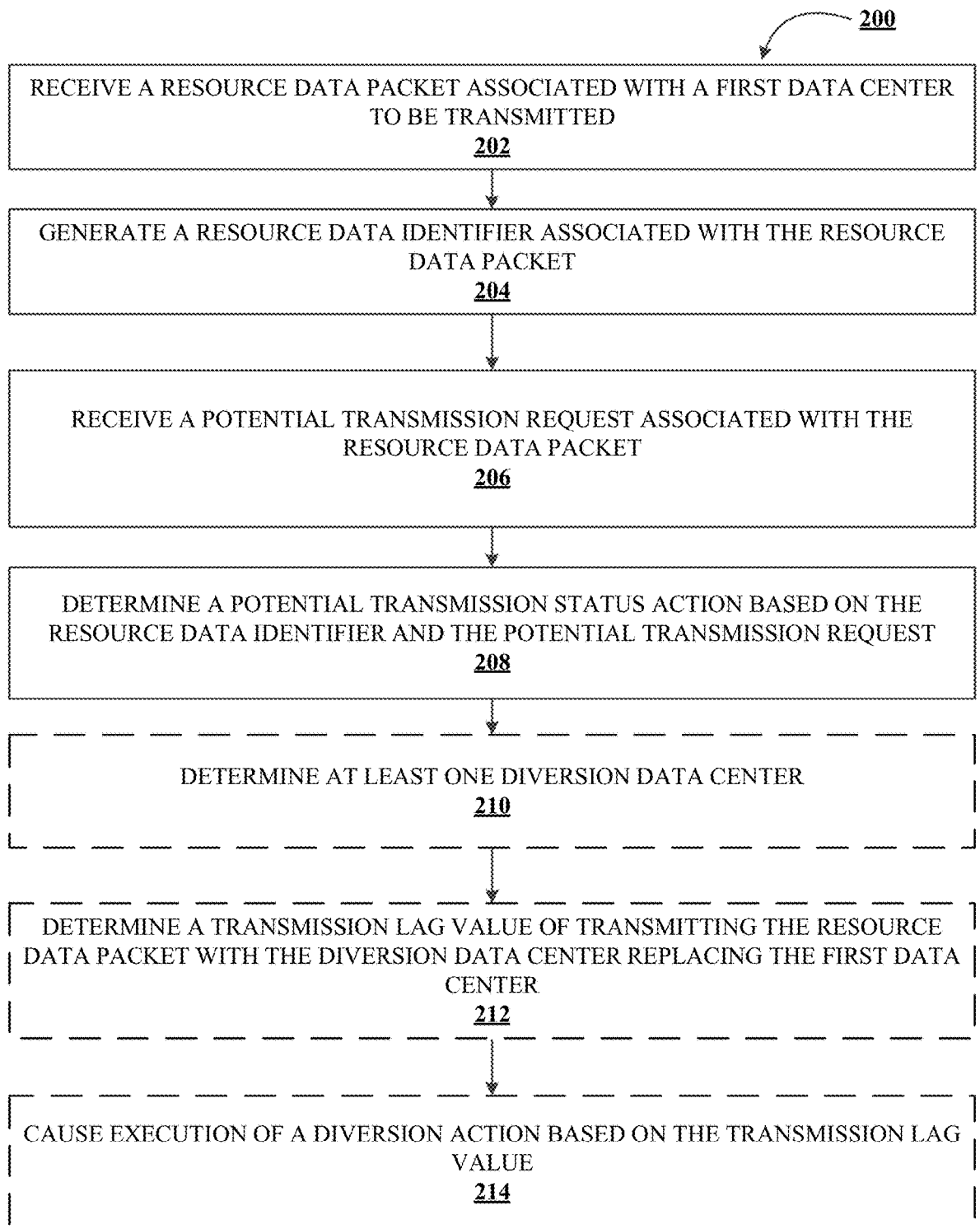
FIG. 2 illustrates a process flow for determining data routing in an electronic environment, in accordance with various embodiments of the present disclosure.

FIG. 2 is a flow chart 200 that illustrates an example method of determining data routing in an electronic network. The method may be carried out by various components of the distributed computing environment 100 discussed herein (e.g., the system 130, the one or more data centers 135, one or more end-point devices 140, etc.). An example system may include at least one non-transitory storage device and at least one processing device coupled to the at least one non-transitory storage device. In such an embodiment, the at least one processing device is configured to carry out the method discussed herein.

Referring now to Block 202 of FIG. 2, the method includes receiving a resource data packet associated with a first data center to be transmitted. A resource data packet may include data to be transmitted and/or information relating to the data to be transmitted across a network 110. For example, the resource data packet may include routing information, account details, transmission history, account and/or user credentials, account limits, and/or the like associated with data to be transmitted across the network 110. In some instances, the resource data packet may include at least a portion of the associated data to be transmitted. Additionally or alternatively, the resource data packet may include information to locate and/or access the data to be transmitted. The resource data packet may be received along with a potential transmission request (discussed below in reference to Block 206 of FIG. 2), such that the resource data packet may be used to cross-reference and/or verify the potential transmission request.

Alternatively, the resource data packet may be processed individually of the potential transmission request, such that the resource data identifier has been generated and is included along with the potential transmission request. For example, an end-point device 140 associated with a user of a peer-to-peer resource sharing electronic network may send a potential transmission request along with the resource data identifier used to identify the data to be transmitted across the network (e.g., information relating to one or more accounts associated with user to transmit resources from one user to another). In such an instance, a single resource data packet may be associated with a given user and the resource data packet can be used for any transmission originated by a user. For example, the resource data packet may include routing information relating to an account associated with the user.

The resource data packet may include information relating to one of more data centers that are associated with the resource data packet. As discussed herein, a first data center may be associated with the resource data packet. The associated data centers may be any data center in which the data to be transmitted should be transmitted therein. The first data center may be an intended originating data center or an intended destination data center. The first data center may be based on past data transmissions. For example, data may be transmitted and/or stored with a specific data center and therefore subsequent transmission may be more efficiently processed by the same data center (e.g., the data center may store at least partial information to expedite the transmission).

The first data center may be determined based on location information relating to the resource data packet. In various embodiments, the location of a user associated with the resource data packet, the location of any requests relating to the resource data packet, the location of the intended data transmission, and/or other location information may be used to select the first data center. For example, a user of a peer-to-peer resource sharing electronic network may be assigned a specific data center to store at least a portion of data relating to the user and therefore, the first data center may be the specific data center. In such an example, the specific data center may be selected based on the proximity of the data center to the user and/or the end-point device(s) 140 associated with the user.

In various embodiments, the first data center may correspond to a location in which the resource data packet is originally received. For example, a user may register in an electronic network (e.g., via an end-point device 140) and the registration may include a generation of the resource data packet that is transmitted to one or more data centers. In such an example, the first data center may be one of the data centers that processed the resource data packet (e.g., the first data center may have additional information stored relating to the resource data packet and therefore would not have to add strain to the network to obtain the information).

In various embodiments, the first data center may be based on the proximity of a sending user to the data center and/or the proximity of the receiving user to the data center. For example, a user may submit a request for data transmission (e.g., a request to send data, such as a resource, from an account associated with the sending user to an account associated with the receiving user) and the first data center may be identified as the data center proximate to the sending user and/or the receiving user. Additionally or alternatively, the first data center may be identified as a data center that has data relating to the proposed data transmission (e.g., a given user may have account information stored on a given data center).

In various embodiments, one or more additional data centers may also be associated with the resource data packet. In an example embodiment, the first data center is an intended originating data center and the second data center is an intended destination data center. For example, the location of the sending user of a peer-to-peer resource sharing electronic network may be used to determine the first data center and the location of the receiving user of the peer-to-peer resource sharing electronic network may be used to determine the second data center. Various other data centers may also be associated with the resource data packet, such as data centers that are capable of processing the data transmission more efficiently (e.g., data centers able to handle data size, intended transmission speed, and/or the like), intermediate data centers that transmit the data between the originating data center and the destination data center, and/or the like.

Referring now to Block 204 of FIG. 2, the method includes generating a resource data identifier associated with the resource data packet. The resource data identifier may be used to identify information relating to the resource data packet including, for example, the data to be transmitted, data type, data size, intended originating data center, intended destination data center, sending user information, receiving user information, and/or various other information relating to the resource data packet and/or the data associated with the resource data packet. The resource data identifier may indicate the first data center as discussed above in reference to Block 202 of FIG. 2.

In various embodiments, the resource data identifier may be an alphanumerical identifier (e.g., one or more alphanumerical characters). In such an instance, one or more of the alphanumerical values may indicate the first data center (e.g., the last number of the resource data identifier may indicate the first data center). The resource data identifier may also indicate additional information using the alphanumerical value. For example, the resource data identifier may include information relating to one or more additional data centers, data information, user account information, and/or the like.

The resource data identifier may also be encrypted and/or otherwise secured to prevent tampering and/or malfeasance. For example, the resource data identifier may be encrypted (e.g., using a hash function) and the decrypted value indicates the one or more data centers associated with the resource data packet. In such an instance, one or more entities in the network may be capable of decrypting the resource data identifier. In such an instance, the resource data identifier can securely be transmitted across the network 110.

Referring now to Block 206 of FIG. 2, the method includes receiving a potential transmission request associated with the resource data packet. The potential transmission request may be part of the resource data packet (e.g., received by the system as a singular request). Alternatively, the potential transmission request may be a subsequent request to execute the transmission associated with the resource data packet (e.g., the potential transmission request may include the resource data identifier instead of the entire resource data packet). The potential transmission request may include information relating to a potential transmission of the data associated with the resource data packet. Such information may include data to be transmitted, originating information (e.g., originating data center), transmission value, destination information (e.g., destination data center), and/or other information relating to the transmission.

The potential transmission request may be a transaction request on a peer-to-peer resource sharing electronic network. In such an instance, the potential transmission request may include information to identify an account associated with the sending user, an account associated with the receiving user, a transaction value, routing information for the sending user and/or the receiving user, and/or the like. For example, an end-point device(s) 140 associated with the sending user may transmit a potential transmission request with transaction information, such as the account credentials, transaction amount, receiving user information, and/or the like. In such an instance, the resource data identifier can be used to determine the data to be transmitted is a resource from the sending user to the receiving user. In the example in which the system is being used for a peer-to-peer resource sharing electronic network, each user or account associated with a user may be assigned a resource data packet that includes the information necessary to complete a transaction transmission from an account associated with the user. In such an instance, the potential transmission request may be a in the form of a transaction request (e.g., sending a resource from the account associated with the user to another account associated with another user (or in some cases the same user)) and the transaction request may include the resource data packet and/or information to obtain and/or access the resource data packet (e.g., a user account number or other identifier for the system to access the resource data packet). As such, the same resource data packet may be used for each transmission and the user may provide additional information, such as destination, transaction amount, and/or the like.

Referring now to Block 208 of FIG. 2, the method includes determining a potential transmission status action based on the resource data identifier and the potential transmission request. The potential transmission status action is a determination on whether to approve or reject the potential transmission request.

The system is configured to compare the information retrievable from the resource data identifier (e.g., information from the resource data packet) to the information in the potential transmission request. For example, the potential transmission request may include information relating to the location of the end-point device(s) 140 used to send the potential transmission and such location can be compared to the first data center associated with the resource data packet (e.g., the location of the first data center may be based on the typical or expected location of the user). The location of the sending user and/or the receiving user may be approximated by the intended originating data center and/or the intended destination data center of the potential transmission request. For example, a potential transmission request may indicate the data centers to be used to complete the transmission and said data centers may be used to proximate user location and compare the user location to the expected location (e.g., the location of the first data center from the resource data packet).

In various embodiments, the potential transmission is caused to be executed in an instance in which the first data center corresponds to at least one of the originating data center or the destination data center of the potential transmission. The first data center is an expected data center for the transmission of the data associated with the resource data packet and therefore, in an instance in which the first data center corresponds to at least one of the originating data center or the destination data center of the potential transmission, then the potential transmission is likely valid (e.g., not malfeasant).

In an instance in which the first data center does not corresponds to at least one of the originating data center or the destination data center of the potential transmission, then the transmission may be malfeasant. In various embodiments, malfeasant may also include accidental transmissions and does not necessarily require intent to be considered malfeasant. In an instance in which the first data center does not corresponds to at least one of the originating data center or the destination data center of the potential transmission, the potential transmission may be delayed, altered, and/or rejected. For example, the potential transmission may be flagged for additional review (e.g., manual oversight), changed to be routed through the first data center, or rejected. In some instances, a user may be prompted to update and/or review the potential transmission request to confirm that the information is correct (e.g., the user may be provided a notification that identifies the potential transmission as potentially malfeasant and may be prompted to edit the information, which is then processed again using the method herein).

Referring now to optional Block 210 of FIG. 2, the method includes determining at least one diversion data center. The diversion data center is used to divert transmission of the data associated with the resource data packet in an instance in which the first data center is offline. Data centers may be temporarily and/or permanently brought offline for maintenance, upgrade, replacement, and/or the like. In such an instance, the first data center (and any other data centers associated with the resource data packet) may not be operational to complete a given transmission. As such, a diversion data center may be determined and used to process the transmission (e.g., the data would travel through the diversion data center instead of the first data center).

The selection of the diversion data center may be based on similarities to the first data center, capacity, data center location, network priority, and/or the like. The diversion data center may be a data center typically used in the network or the diversion data center may be a replacement data center (e.g., brought online during the time in which the first data center is offline). The diversion data center may be multiple data centers that are each taking a portion of the transmissions typically processed by the first data center. Additionally, the diversion data center may merely be one or more additional servers within the first data center (e.g., one server of a data center may be brought offline, and the rest of the data center may remain operational).

Referring now to optional Block 212 of FIG. 2, the method includes determining a transmission lag value of transmitting the resource data packet with the diversion data center replacing the first data center. The transmission lag value may be based on a comparison to historical transmission information. For example, the transmission lag value may be the difference between the processing and/or transmission time of the data to be transmitted in an instance in which the first data center is operational and the processing and/or transmission time of the data to be transmitted in an instance in which the first data center is non-operational (e.g., the diversion data center is being used instead of the first data center for the transmission). In some instances, the transmission lag value may be based on the difference between the processing and/or transmission time of the data to be transmitted in an instance in which the first data center is non-operational and a target processing and/or transmission time. The transmission lag value indicates whether transmissions are slower than an instance in which the first data center is online. A higher lag value may indicate that the system is runner slower due to the first data center being offline.

Referring now to optional Block 214 of FIG. 2, the method includes causing execution of a diversion action based on the transmission lag value. In an instance in which the transmission lag value is above a lag threshold, an action may be completed to improve the transmission speed. The lag threshold may be a predetermined value that is considered acceptable for the diversion data center to be operating. In an instance in which the transmission lag value is below the lag threshold, the diversion data center is maintained as the replacement to the first data center while the first data center is non-operational. In an instance in which the transmission lag value is below the lag threshold, the diversion action may be executed to improve the processing and/or transmission speed.

The diversion action may be to bring the first data center back online in an instance in which the transmission lag value is above a lag threshold. Additionally or alternatively, additional network resources may also be dedicated to reducing the transmission lag value (e.g., the diversion data center may be given network priority to improve transmission timing or additional data centers may be used to reduce any potential bottlenecks). The diversion action selected may be based on the reason in which the first data center is non-operational. For example, in an instance in which the first data center is undergoing maintenance, the maintenance may be stopped and/or delayed to allow the first data center to be brought back online in an instance in which the transmission lag value is above a lag threshold. Alternatively, the diversion action may be different in an instance in which the first data center cannot be brought back online (e.g., if the first data center is broken, then the diversion action may be focused on improving the diversion data center functionality until the first data center is capable of being brought back online).

As will be appreciated by one of ordinary skill in the art, various embodiments of the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for determining data routing in an electronic environment, the system comprising:
   at least one non-transitory storage device; and
   at least one processing device coupled to the at least one non-transitory storage device, wherein the at least one processing device is configured to:
   receive a resource data packet to be transmitted, wherein the resource data packet is associated with a first data center;
   generate a resource data identifier associated with the resource data packet, wherein the resource data identifier indicates the first data center;
   receive a potential transmission request associated with the resource data packet, wherein the potential transmission request comprises at least one of an originating data center or a destination data center of a potential transmission; and
   determine a potential transmission status action based on the resource data identifier and the potential transmission request, wherein the potential transmission is caused to be executed in an instance in which the first data center corresponds to at least one of the originating data center or the destination data center of the potential transmission.

2. The system of claim 1, wherein the potential transmission status action is a rejection of the potential transmission request in an instance in the first data center is different than both of the originating data center and the destination data center of the potential transmission.

3. The system of claim 1, wherein the resource data packet is further associated with a second data center, wherein at least one of the first data center or the second data center is an intended originating data center and at least one of the first data center or the second data center is an intended destination data center.

4. The system of claim 1, wherein the first data center corresponds to a location in which the resource data packet is originally received.

5. The system of claim 4, wherein the resource data identifier comprises an alphanumerical value corresponding to the location of the data received.

6. The system of claim 1, wherein the at least one processing device is configured to determine at least one diversion data center, wherein the diversion data center is used to divert transmission of the resource data packet in an instance in which the first data center is offline.

7. The system of claim 6, wherein the at least one processing device is configured to:
   determine a transmission lag value of transmitting the resource data packet with the diversion data center replacing the first data center; and
   cause execution of a diversion action based on the transmission lag value, wherein the first data center is brought online in an instance in which the transmission lag value is above a lag threshold.

8. A computer program product for determining data routing in an electronic environment, the computer program product comprising at least one non-transitory computer-readable medium having computer-readable program code portions embodied therein, the computer-readable program code portions comprising:
   an executable portion configured to receive a resource data packet to be transmitted, wherein the resource data packet is associated with a first data center;
   an executable portion configured to generate a resource data identifier associated with the resource data packet, wherein the resource data identifier indicates the first data center;
   an executable portion configured to receive a potential transmission request associated with the resource data packet, wherein the potential transmission request comprises at least one of an originating data center or a destination data center of a potential transmission; and
   an executable portion configured to determine a potential transmission status action based on the resource data identifier and the potential transmission request, wherein the potential transmission is caused to be executed in an instance in which the first data center corresponds to at least one of the originating data center or the destination data center of the potential transmission.

9. The computer program product of claim 8, wherein the potential transmission status action is a rejection of the potential transmission request in an instance in the first data center is different than both of the originating data center and the destination data center of the potential transmission.

10. The computer program product of claim 8, wherein the resource data packet is further associated with a second data center, wherein at least one of the first data center or the second data center is an intended originating data center and at least one of the first data center or the second data center is an intended destination data center.

11. The computer program product of claim 8, wherein the first data center corresponds to a location in which the resource data packet is originally received.

12. The computer program product of claim 11, wherein the resource data identifier comprises an alphanumerical value corresponding to the location of the data received.

13. The computer program product of claim 8, wherein the computer program product further comprises an executable portion configured to determine at least one diversion data center, wherein the diversion data center is used to divert transmission of the resource data packet in an instance in which the first data center is offline.

14. The computer program product of claim 13, wherein the computer program product further comprises:
   an executable portion configured to determine a transmission lag value of transmitting the resource data packet with the diversion data center replacing the first data center; and
   an executable portion configured to cause execution of a diversion action based on the transmission lag value, wherein the first data center is brought online in an instance in which the transmission lag value is above a lag threshold.

15. A computer-implemented method for determining data routing in an electronic environment, the method comprising:
   receiving a resource data packet to be transmitted, wherein the resource data packet is associated with a first data center;
   generating a resource data identifier associated with the resource data packet, wherein the resource data identifier indicates the first data center;
   receiving a potential transmission request associated with the resource data packet, wherein the potential transmission request comprises at least one of an originating data center or a destination data center of a potential transmission; and
   determining a potential transmission status action based on the resource data identifier and the potential transmission request, wherein the potential transmission is caused to be executed in an instance in which the first data center corresponds to at least one of the originating data center or the destination data center of the potential transmission.

16. The method of claim 15, wherein the potential transmission status action is a rejection of the potential transmission request in an instance in the first data center is different than both of the originating data center and the destination data center of the potential transmission.

17. The method of claim 15, wherein the resource data packet is further associated with a second data center, wherein at least one of the first data center or the second data center is an intended originating data center and at least one of the first data center or the second data center is an intended destination data center.

18. The method of claim 15, wherein the first data center corresponds to a location in which the resource data packet is originally received, and the resource data identifier comprises an alphanumerical value corresponding to the location of the data received.

19. The method of claim 15, further comprising determining at least one diversion data center, wherein the diversion data center is used to divert transmission of the resource data packet in an instance in which the first data center is offline.

20. The method of claim 19, further comprising:
   determining a transmission lag value of transmitting the resource data packet with the diversion data center replacing the first data center; and
   causing execution of a diversion action based on the transmission lag value, wherein the first data center is brought online in an instance in which the transmission lag value is above a lag threshold.

* * * * *